Patented Apr. 19, 1932

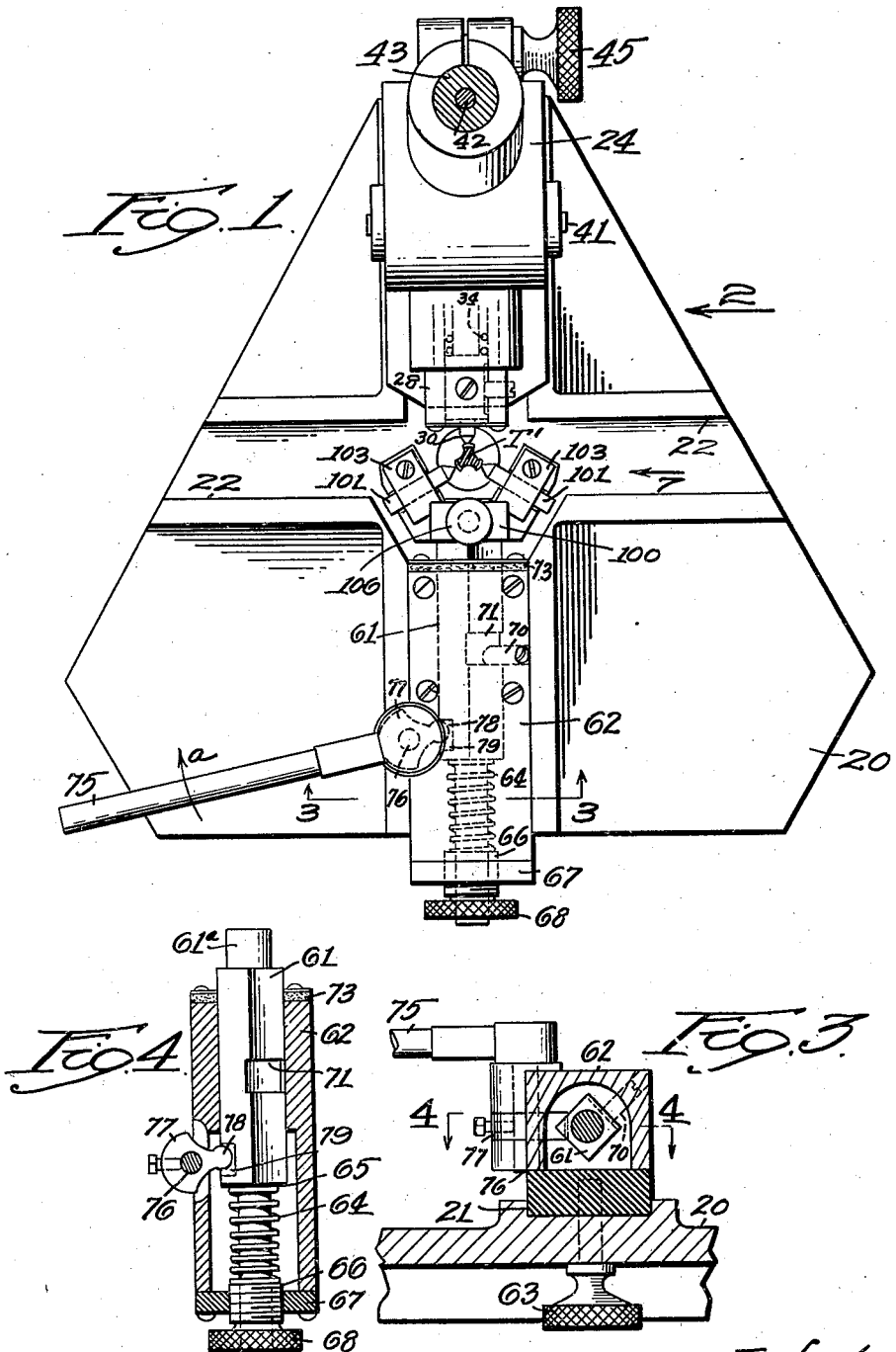

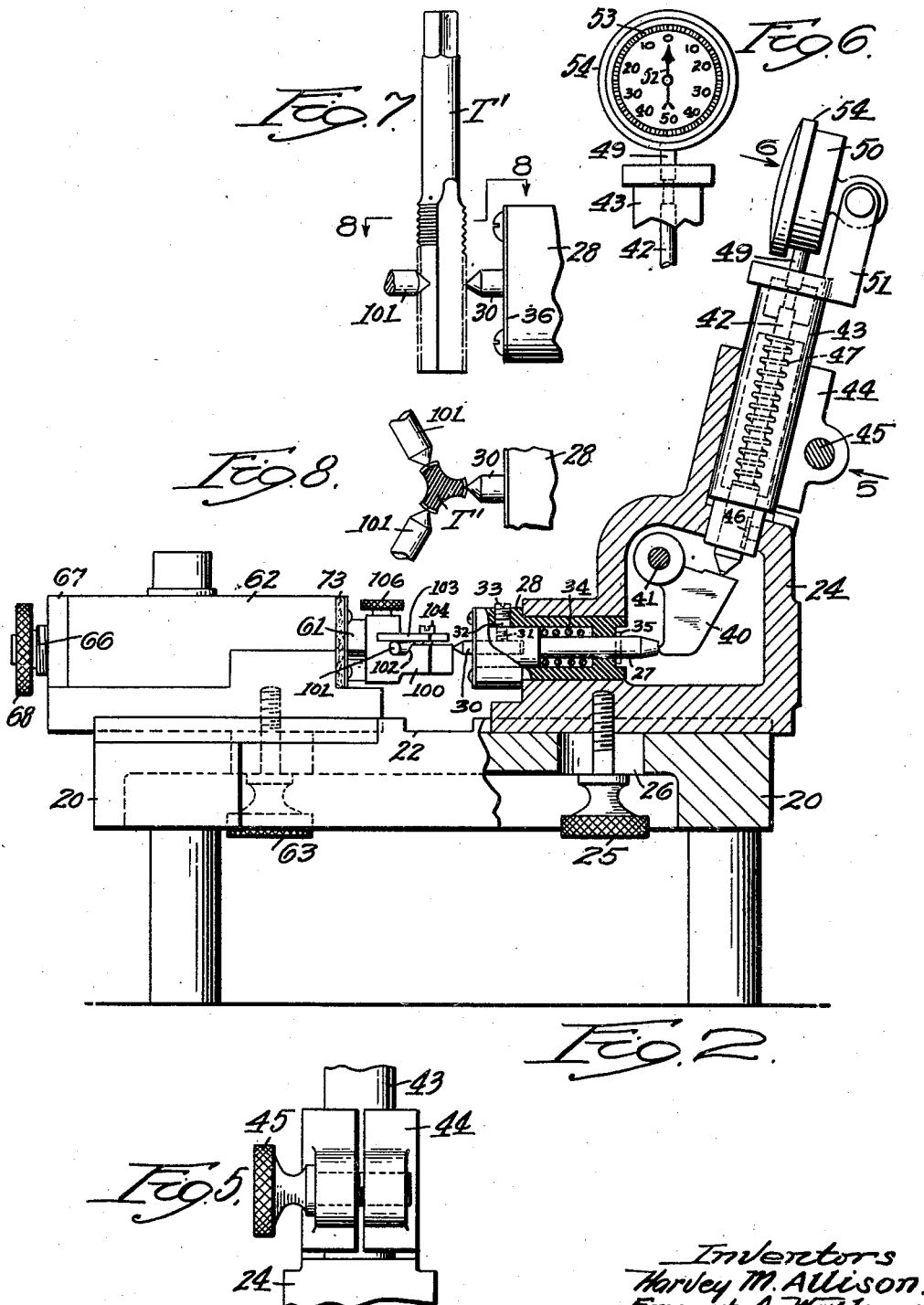

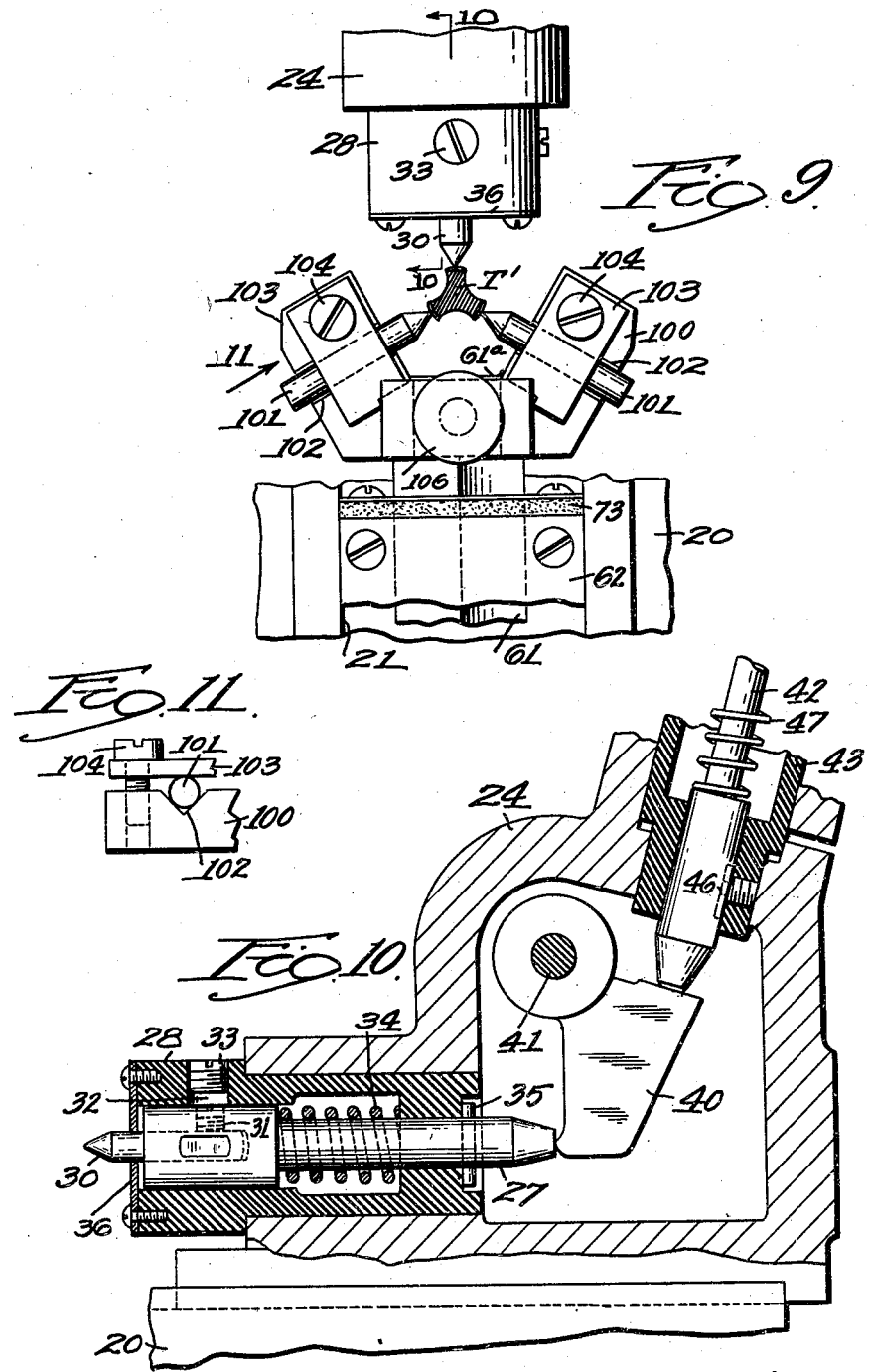

1,854,243

UNITED STATES PATENT OFFICE

HARVEY M. ALLISON AND ERNEST A. WALKER, OF WORCESTER, MASSACHUSETTS, ASSIGNORS TO JOHN BATH, OF WORCESTER, MASSACHUSETTS

MACHINE FOR MEASURING THREE-FLUTED TAPS

Original application filed October 22, 1928, Serial No. 314,032. Divided and this application filed April 2, 1930. Serial No. 441,152.

This case is a division of our prior applicaton Serial No. 314,032, filed by us October 22, 1928.

This invention relates to a machine for measuring taps or other threaded work and particularly to a machine for indicating variations in size of such work with respect to a standard or master gauge.

It is the general object of our invention to provide a machine by which such measurements and comparisons may be quickly and easily made and by which the comparative variations from a standard gauge will be plainly shown.

A further object is to provide a measuring machine which may be readily adapted to the measurement of taps of different sizes and pitches.

Our invention further relates to arrangements and combinations of parts which will be hereinafter described and more particularly pointed out in the appended claims.

An operative form of the invention is shown in the drawings in which,

Fig. 1 is a plan view of our improved machine, adapted to the measurement of three-fluted taps;

Fig 2 is a side elevation thereof, partly in section, and looking in the direction of the arrow 2 in Fig. 1;

Fig. 3 is a partial sectional front elevation, taken along the line 3—3 in Fig. 1;

Fig. 4 is a sectional plan view, taken along the line 4—4 in Fig. 3;

Fig. 5 is a detail rear view, looking in the direction of the arrow 5 in Fig. 2;

Fig. 6 is a detail front view, looking in the direction of the arrow 6 in Fig. 2;

Fig. 7 is a detail side elevation, looking in the direction of the arrow 7 in Fig. 1;

Fig. 8 is a sectional plan view, taken along the line 8—8 in Fig. 7;

Fig. 9 is an enlarged plan view of certain parts;

Fig. 10 is a sectional side elevation, taken substantially along the line 10—10 in Fig. 9 but showing additional parts, and Fig. 11 is a detail side elevation, looking in the direction of the arrow 11 in Fig. 9.

Referring to the drawings, our improved measuring machine comprises a stand or table 20 (Fig. 1) having guideways 21 and 22 formed on the upper surface thereof, in the shape of a rectilinear cross.

A stand or casing 24 is slidable in the rear portion of the guideway 21 and may be secured in adjusted position therein by a clamping screw 25 (Fig. 2) extending through a slot 26 in the table 20.

A plunger 27 is slidable in a bushing 28 fixed in the casing 24 and is provided with a contact member 30 which may be secured therein by a set screw 31 (Fig. 2). Access to the screw 31 may be had through an opening 32 in the bushing 28, said opening being normally closed by a screw 33. A spring 34 presses the plunger 27 yieldingly outward and a pin 35 limits the outward movement. The front end of the bushing 28 may be provided with a cover plate 36 through which the contact member 30 is slidable. The cover plate assists in preventing the access of dirt to the indicating mechanism.

A segment member 40 is pivoted at 41 in the casing 24 and forms an angle connection between the rear end of the plunger 27 and the lower end of a spring-pressed plunger 42, slidable vertically in a bearing member 43 mounted in a split holder 44 on the casing 24. The member 43 may be secured in desired adjusted position by tightening the split holder 44 by means of a clamping screw 45 (Fig. 5).

The plunger 42 is keyed in the bearing frame 43, as indicated at 46, and is provided with a spring 47 yieldingly pressing the plunger downward. At its upper end, the plunger 42 engages the plunger 49 of a magnifying and indicating device 50, preferably mounted on an upward projection 51 (Fig. 2) of the bearing frame 43.

The indicating device 50 is provided with a pointer 52 movable by the plungers 42 and 49 over a dial 53. The dial 53 is preferably mounted in a ring 54 frictionally held on the casing of the indicator 50, so that it may be turned angularly as desired in either direction.

The indicating device 50 may be otherwise of any usual commercial form and the remaining details thereof form no part of our present invention.

A square plunger 61 (Figs. 1 and 2) is slidably mounted in a stand 62. The stand 62 is adjustable forward and rearward in the front portion of the guideway 21 and may be secured in adjusted position in said guideway by a clamping screw 63.

A spring 64 (Fig. 4) is interposed between a shoulder 65 on the plunger 61 and a bushing 66 threaded in a cap 67 at the front end of the stand or casing 62. The bushing 66 has a knurled head 68 for convenient adjustment of the tension on the spring 64. It will be understood that the spring 64 is very substantially stronger than the combined strength of the springs 34 and 47 previously described.

A stop pin 70 (Fig. 1) in the stand 62 projects into a slot 71 in the square plunger 61 and engages an end wall of the slot, thereby limiting rearward movement of the anvil or contact member 60 and providing a definite zero position thereof. A felt packing 73 prevents the entrance of dirt around the plunger 61.

A hand lever 75 is provided with a stud 76 (Fig. 3) pivoted in a fixed bearing in the stand 62 and having a member 77 secured thereto. The member 77 has a convex head 78 positioned in a slot 79 in the plunger 61. By turning the handle 75 in the direction of the arrow $a$ in Fig. 1, the plunger 61 may be forced forward or away from the work, compressing the spring 64. The head 78 has a limited lost motion in the slot 79.

The square plunger 61 previously described has a swivel member 100 loosely mounted on the cylindrical extension 61$^a$ (Fig. 4) of said plunger. Contact members 101 are seated in V-shaped grooves 102 (Fig. 11) in the member 100 and are secured in axially adjusted position therein by clamps 103 and clamping screws 104.

The grooves 102 are disposed at an angle of 120° from each other and the contact members 101 are equally spaced from the axis of the plunger 61. It will be evident that the thread groove as engaged by one of the members 101 will be at a slightly different elevation from the thread groove as engaged by the other member 101, due to the lead of the thread.

By loosely pivoting the swivel member 100 on the plunger 61, we are able to turn the member angularly and thus set the contact members 101 at an angle to correspond to the lead of the tap to be measured, this angle varying according to the pitch of the thread. When correctly set, the member 100 may be secured in fixed position on the plunger 61 by a clamping screw 106.

The axes of the plungers 27 and 42 (Fig. 10) are so disposed with respect to the pivot 41 of the segment member 40 that the movement of the upper plunger 42 is reduced in the proportion of three to two, this change in leverage being made necessary by the sixty degree engagement of the contact members 101 with two of the three sets of teeth on the tap T'.

Having described the details of construction of our invention as designed for measuring three-fluted taps, the method of operation thereof is as follows:—

The handle 75 is first moved in the direction of the arrow $a$ in Fig. 1 to withdraw the plunger 61, and a standard or master thread gauge is then placed in position between the several contact members.

The casing 24 for the indicating plunger 30 is then adjusted forward or rearward to cause the plunger 30 to be engaged by the master gauge as positioned by the contact members 101 on the plunger 61, and to cause said indicating plunger 30 to be moved inward in the bushing 28 a short distance, compressing the spring 34.

The bearing frame 43 is then adjusted axially to place the plunger 42 under compression and to move the pointer 52 in the indicating device a certain angular amount, any one revolution, from its zero or base position.

The parts are secured in these adjusted positions and the dial ring 54 is then turned on the indicating device 50 to bring the zero of the dial to correspond to the position of the arrow 52.

The rearward movement of the plunger 61 forces the contact members 101 against two of the threaded lands of the tap T' and forces the third threaded land of the tap against the indicating contact member 30, moving said member 30 rearward a certain distance, depending upon the exact diameter of the tap T'. Any variation in diameter will be made evident by a glance at the indicating device 50, the pointer indicating the variation over size or under size by its movement in one direction or the other from the fixed zero. The dial as shown is graduated to read the variation in tenths of thousandths, but the variation may be magnified to any desired additional extent.

By the use of the machine above described, we are able to inspect taps with ease and rapidity and to very quickly and accurately determine any variation thereof, either over or under the standard diameter as fixed by the master gauge.

The points of the contact members 30 and 101 are suitably shaped to engage between the screw threads. The points are then generally hardened or may be provided with diamond points.

Having described our improved measuring machine and its application to taps having three flutes, the use and utility of the machine will be readily apparent as well as its application to taps having any other number of flutes divisible by three. Accordingly, we do not wish to be limited to the details herein disclosed, otherwise than as set forth in the claims, but what we claim is:—

1. In a measuring machine, a contact member, an indicating device operable thereby, a pair of positioning members opposed to said contact member and mounted to engage a three-fluted tap at points 120° apart on said tap and 120° from the point of engagement of said tap by said contact member, a swivel head in which said positioning members are axially adjustable, a slidable but non-rotatable positioning plunger on which said head is mounted to swivel, means to locate said positioning plunger in a predetermined normal position, means to secure said swivel head in angularly adjusted position on said plunger, manual means to withdraw said plunger from said predetermined normal position, and means to return said plunger to said predetermined normal position.

2. In a measuring machine, a horizontally movable yieldingly positioned contact member, a pair of positioning members mounted to engage an article to be measured at points 120° apart on said article and 120° from the point of engagement of said article by said contact member, indicating mechanism mounted in said casing and having an actuating plunger angularly disposed with respect to the line of movement of said contact member, and connections between said contact member and said plunger including a segmental member pivoted in said casing and having engaging surfaces angularly disposed to correspond to the relative angular positions of said contact member and said plunger and engaged by the contact member and plunger at distances from its pivot in substantially the relation of three to two, thereby reducing the movement of said plunger relative to the movement of said contact member in substantially the ratio of two to three.

3. In a thread measuring machine, a contact member, an indicating device operable thereby, a pair of positioning members opposed to said contact member and spaced apart to engage between the teeth in separate lands of a three-fluted tap, a supporting member on which said positioning members are mounted in angularly adjusted relation, yielding means to move said supporting member to a predetermined normal position and to thereby force the tap against said contact member, and manual means to withdraw said supporting member from said predetermined normal position.

4. A thread measuring machine as set forth in claim 3, in which the positioning members are both secured in a swivel member which is mounted for angular adjustment on the supporting member, and in which means is provided for securing said swivel member to said supporting member in angular adjusted position.

In testimony whereof we have hereunto affixed our signatures.

HARVEY M. ALLISON.
ERNEST A. WALKER.